April 24, 1962     D. M. CLARK     3,030,945
SHUTOFF CONTROL VALVE FOR SPHYGMOMANOMETER
Filed Jan. 6, 1961
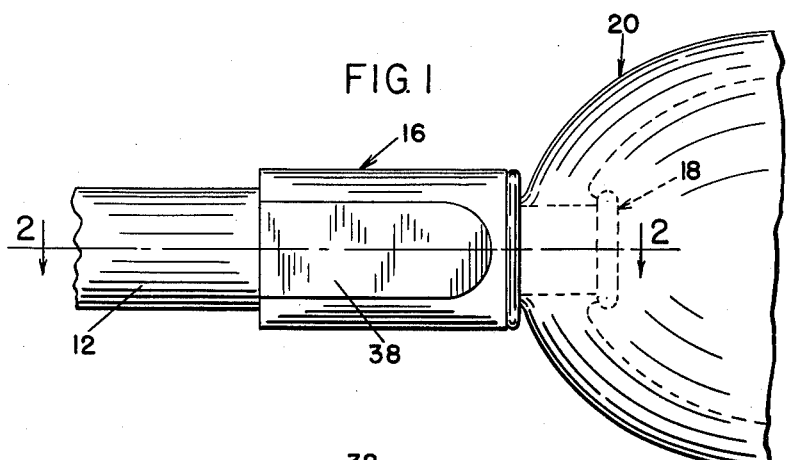
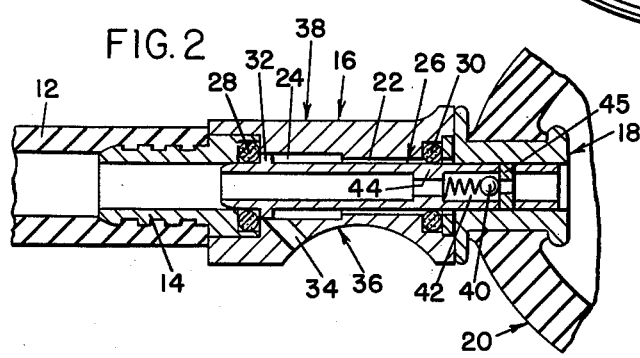
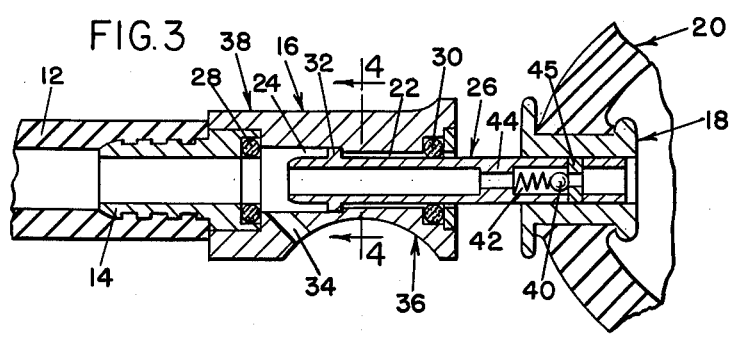
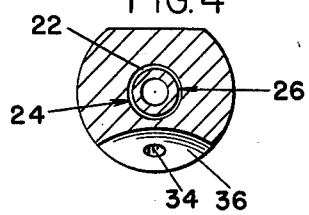
INVENTOR
DAVID M. CLARK
ATTORNEY

United States Patent Office 3,030,945
Patented Apr. 24, 1962

3,030,945
SHUTOFF CONTROL VALVE FOR
SPHYGMOMANOMETER
David M. Clark, Paxton, Mass., assignor to David Clark Company Incorporated, Worcester, Mass., a corporation of Massachusetts
Filed Jan. 6, 1961, Ser. No. 81,002
3 Claims. (Cl. 128—2.05)

This invention relates to a shutoff valve control construction for sphygmomanometers and particularly to a new and improved shutoff valve which enables the operator to prevent leakage of air whereby the sphygmomanometer, or the like, can be used as a tourniquet, and by the use of a bleeding hole with the valve in open position, the device can be used in the usual manner as a sphygmomanometer as and for the purposes shown and described in prior Patents No. 2,678,040 and No. 2,704,065.

Other objects of the invention include the provision of a shutoff valve control construction adapted to be applied to a sphygmomanometer or the like and including a bleed hole which is finger operated by the operator to provide a slow leak control, including a pressure bulb comprising a fitting for a hose leading to the object being inflated such as the sphygmomanometer, said fitting transmitting air thereto and provided with a bleed hole for controlled release of the air pressure, the hole being in position for the natural application thereto of the finger of the operator, whereby the operator can release the pressure as desired to control the rate of release of the air to a fine degree for quick, easy and accurate self-predetermination of blood pressure, etc., and at the same time there being a quickly and easily operated shutoff valve which prevents the operation of the bleed hole and the slow leak so as to preserve the pressure in the object inflated, such as a sphygmomanometer, whereby the same may be utilized as a tourniquet.

The invention further relates to arrangements and combinations of parts which will be hereinafter described and more particularly set forth in the appended claims.

Reference is to be had to the accompanying drawings in which

FIG. 1 is a view in elevation showing the device applied to a pressure bulb and the hose leading to the object to be inflated;

FIG. 2 is a longitudinal section on line 2—2 of FIG. 1;

FIG. 3 is a view similar to FIG. 2 but showing the valve in open condition; and

FIG. 4 is a section on line 4—4 of FIG. 3.

Reference is made to the patents above referred to showing sphygmomanometers of the prior art. These are as is that of the present case particularly adapted for self application although they may be in any convenient form such as an annulus or the prior art type of an elongated envelope adapted to be wound about the limb in which the pressure is to be observed, or in the present case to which a tourniquet is desired to be applied.

There is a hose 12 leading to the sphygmomanometer and this is applied to a fitting 14 at one end of the valve housing generally indicated at 16. The opposite end of the housing is provided with a control knob or fitting generally indicated at 18 for attachment to the air pressure bulb generally indicated at 20. These parts form a connection from the bulb to the hose.

The bulb may be of the well known prior art type which delivers air upon being alternately squeezed and relaxed, the air passing through the fitting to be described and into the tube for the sphygmomanometer or other object to be inflated.

The main part of the valve housing is located between the parts 14 and 18 and comprises in general a barrel or thimble having a through passage which is indicated at 22, this passage being enlarged in a chamber at 24 for a purpose to be described, and the element 18 which is secured in the squeeze bulb is mounted on a tubular member generally indicated at 26, the same having a limited in-and-out motion relative to the main body member 16 and being slidably guided in passage 22 and also sealed in by a pair of O-rings 28 and 30.

FIG. 2 shows the valve in its inwardmost position wherein the same is closed as will be hereinafter described and FIG. 3 shows the opposite condition where the valve is open, and it will be seen that an annular flange or ringlike member 32 on the tubular member 26 acts as a stop in either direction of motion of member 26. This motion is achieved by grasping the housing 16 in one hand and the squeeze bulb in the other and either pulling or pushing the parts in order to achieve the action desired.

The annular stop member 32 is adapted to relatively travel back-and-forth in the enlarged portion 24 of the passage 22 and this provides an air chamber about the exterior surface of the member 26 which communicates with a bleed hole 34. The bleed hole 34 extends into a shaped outer surface portion of housing 16 as indicated at 36 for the convenience of the hand of the operator, so that he can use his thumb or finger for the purpose of covering or uncovering the bleed hole. The opposite portion of housing 16 may be provided with a flat at 38 if this is desired to facilitate handling of the device.

The tubular member 26 is generally hollow from end-to-end thereof but is provided with a ball valve of more or less conventional construction as indicated at 40, so that when the air passes from right to left in FIGS. 2 and 3, it passes into tube 12 but cannot escape in the opposite direction. The ball valve 40 may be provided with a spring or the like to back it up in the relatively small chamber which is indicated at 42, this chamber being formed by partitions 44 and 45 which have through apertures as will be appreciated for the passage of air in a direction from the bulb to the hose.

With the control knob 18 in the position shown in FIG. 2, the bleed hole 34 is ineffective to allow air under pressure to escape outwardly from the tube 12 or the object to be inflated, and therefore in this condition of the device, the object to be inflated may be pumped up and the pressure held therein for use as a tourniquet or the like, or for whatever purpose is desired. However, in the position shown in FIG. 3, the bleed hole 34 is open to the chamber 24 as before but now chamber 24 is open to the fitting 14 and the operator thus is enabled to maintain the pressure in the object to be inflated by placing his finger over the orifice of the hole 34, and he can allow the pressure to escape under definite control as more or less previously described in Patent No. 2,704,065. Thus it will be seen that the objects of the invention are carried out and that the device has a double use so that by closing the valve described, the device can be used as a tourniquet, but if it is desired to release the pressure, this can be done under the control of the operator by means of the bleed hole, when the valve is in its open condition.

Having thus described my invention and the advantages thereof, I do not wish to be limited to the details herein disclosed, otherwise than as set forth in the claims, but what I claim is:

1. A device of the class described comprising a bulb providing air pressure, a hose leading to an object to be inflated thereby, and a means connecting the squeeze bulb and said hose, said means comprising a housing having a longitudinal chamber therethrough, a relatively slidable tubular member in said chamber, means limiting the motion of said slidable member in said chamber, a fitting exterior of the housing but secured to said member for connection to said squeeze bulb, a one-way valve in said fitting and communicating with the interior of the member to provide air to pass from the bulb to the member, said chamber having a portion forming an air chamber, a bleed hole in the housing communicating with said air chamber, said slidable member closing said air chamber from said hose or selectively placing the same in communication therewith upon slidable actuation of said member.

2. The combination of claim 1 wherein said bleed hole forms a passage between said air chamber and the exterior of said valve housing.

3. The device of claim 1 including an operating knob on the tubular member.

References Cited in the file of this patent

UNITED STATES PATENTS

| | | |
|---|---|---|
| 2,624,334 | Epstein | Jan. 6, 1953 |
| 2,704,065 | Clark | Mar. 15, 1955 |
| 2,811,964 | Boucke | Nov. 5, 1957 |